April 5, 1966   D. G. GUMPERTZ   3,244,071
LENS CONSTRUCTION FOR CHARACTER PROJECTION UNITS
Filed March 5, 1965   3 Sheets-Sheet 1

INVENTOR.
DONALD G. GUMPERTZ
BY
Christie, Parker & Hale
ATTORNEYS.

April 5, 1966 D. G. GUMPERTZ 3,244,071
LENS CONSTRUCTION FOR CHARACTER PROJECTION UNITS
Filed March 5, 1965 3 Sheets-Sheet 2
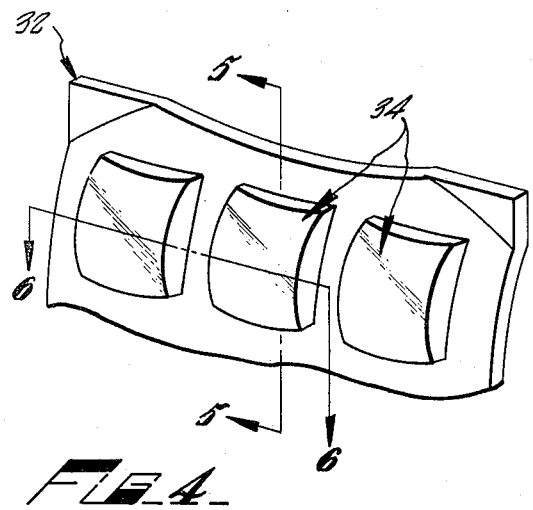
FIG. 4
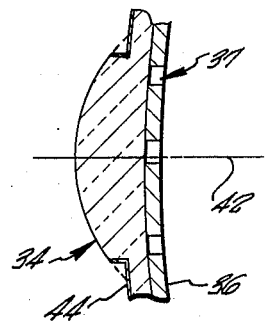
FIG. 5
FIG. 6
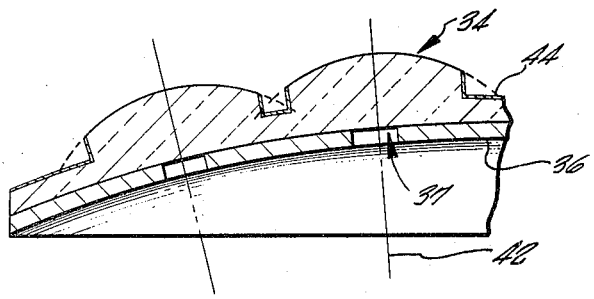
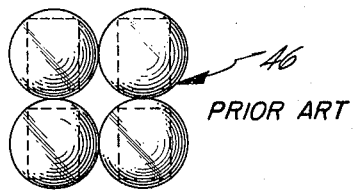
PRIOR ART    FIG. 7
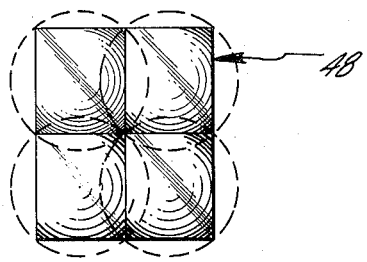
INVENTOR.
DONALD G. GUMPERTZ
BY
Christie, Parker & Hale
ATTORNEYS.

April 5, 1966  D. G. GUMPERTZ  3,244,071
LENS CONSTRUCTION FOR CHARACTER PROJECTION UNITS
Filed March 5, 1965  3 Sheets-Sheet 3

INVENTOR.
DONALD G. GUMPERTZ
BY
Christie, Parker & Hale
ATTORNEYS.

United States Patent Office 3,244,071
Patented Apr. 5, 1966

3,244,071
LENS CONSTRUCTION FOR CHARACTER
PROJECTION UNITS
Donald G. Gumpertz, 4217 Navajo St.,
North Hollywood, Calif.
Filed Mar. 5, 1965, Ser. No. 443,750
5 Claims. (Cl. 88—24)

This is a continuation-in-part of application Serial No. 210,985, filed July 19, 1962, now abandoned.

This invention relates to character projection units of the type employed for selectively displaying different characters on a rectangular screen area, and has particular reference to improvements in the lens construction for such units.

Character projection units are generally employed in large multiples, for example, to display multi-digit numbers, words and various symbols. Conventionally, each projection unit incorporates a rectangular viewing screen which occupies a space in an overall panel display reserved for a single letter, digit or symbol. By selecting the particular number or letter projected by each unit, different multi-digit numbers and words may be displayed. Since each projection unit must be capable of displaying any of a relatively large selection of letters or numerals, say for example, any of the numerals zero through nine, its internal construction is necessarily complicated. This complication is compounded by requirements for compactness resulting from the fact that the display units must be closely packed together so as to provide a conventional spacing between the digits and letters of multi-digit numbers and words.

The problem of compactness is solved to a great degree by the employment of lens plates which support the individual lenses of a multiplicity of converging projection systems, as described and claimed in United States Patent 3,041,600, issued June 26, 1962.

In accordance with the present invention the size of such character display units may be further decreased while providing the same fidelity of performance, or the same size maintained while providing a higher fidelity performance, by improving the lens plate. The lens plate is a plate of transparent material which is disposed between the rectangular screen and the light sources of the display apparatus. It is provided with an approximately spherical curvature on a radius from the center of the screen and carries a plurality of individual condensing lenses which are formed integrally with the plate material. Each of the condensing lenses has its optical axis aligned with the axis of projetcion of a one of the multiplicity of converging projection systems. The improvement is achieved by forming each condensing lens as a figure of revolution about its optical axis with the perimeter of each lens being chopped off on several sides so that the lens has a polygonal outline rather than the conventional circular outline.

By eliminating the conventional circular outline or perimeter of a lens, what amounts to significantly larger lenses may be employed on the same spaced centers, or what would amount to the same size lens may be empolyed on closer spaced ecnters. Considering the former, larger character forming objects may now be employed, thereby reducing the requirement for magnification in each projection system while achieving sharper and more brilliant images.

The improvement provided by the present invention will be better understood from the following description with reference to the accompanying drawings, in which:

FIG. 4 is a fragmentary perspective view of the rear side of the condenser lens plate of FIG. 3, illustrating the rectangular outlines of the lenses formed in the plate;

FIG. 5 is a fragmentary sectional view taken along line 5—5 of FIG. 4;

FIG. 6 is a fragmentary sectional view taken along line 6—6 of FIG. 4;

FIG. 7 is a schematic drawing of two lens groups with the same center spacings, to illustrate the improvements afforded by the invention;

Figure 1:
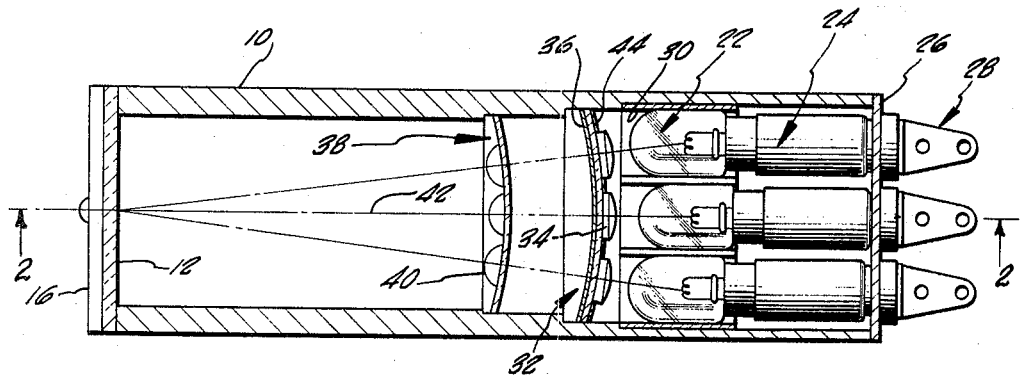
FIG. 1 is a top sectional elevation of a character projection unit embodying the improvements of the present invention.
Figure 2:
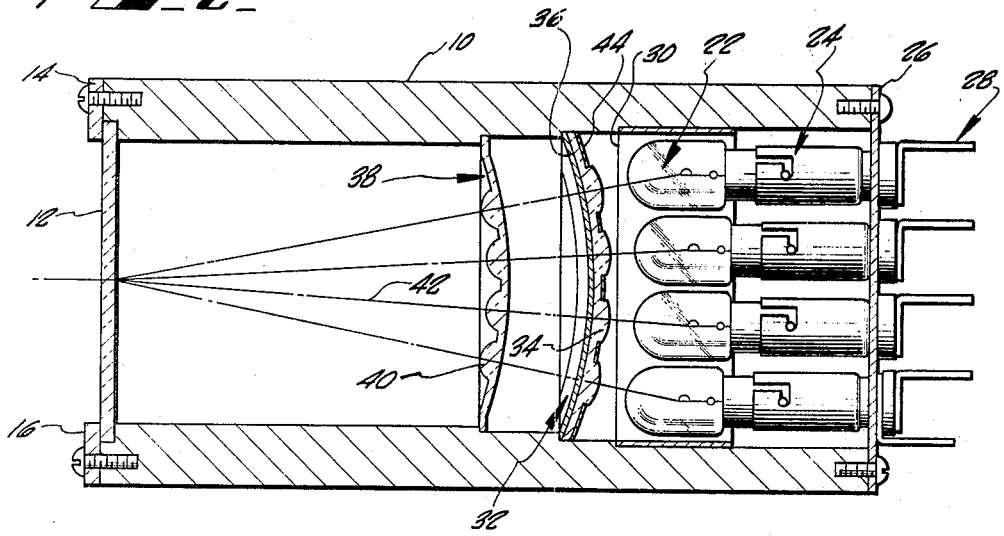
FIG. 2 is a sectional elevation taken along line 2—2 of FIG. 1.

Referring now to FIGS. 1 and 2, a character projection unit includes a hollow rectangular body 10 having rectangular translucent viewing screen 12 mounted across the front end of the body and held in place by means of upper and lower retainers 14, 16. The viewing screen receives projections from the rear, and is viewed from the front. It has a conventional frosted surface on its rear side.

A compact group of small lamps 22 are mounted in a corresponding plurality of sockets 24 fixed to a base plate 26 that covers the rear end of the body 10. Electrical connection is made to the individual lamps by means of electrical terminals 28 extending from the rear of the unit. Assisting in the alignment of the lamps and reducing spurious reflections of light is a grating 30.

Immediately in front of the lamps, and mounted across the interior of the body 10, is a condenser lens plate 32. The condenser lens plate is approximately spherically curved on a radius from the center of the screen, is transparent, and has a plurality of lenses 34 formed integrally in it. The front side of the condenser lens plate is coated as at 36 with an opaque material in which a plurality of character forming objects 37 are etched at positions overlying the lenses in the plate.

A projection lens plate 38 is mounted between the condenser lens plate and the screen. The projection lens plate also is approximately spherically curved on a radius from the center of the screen, is of transparent material, and has a plurality of projection lenses 40 formed integrally therein.

This construction provides a plurality of converging projection systems for selectively projecting any of a plurality of characters onto the rectangular viewing screen. The filaments of the respective lamps, the respective condensing lenses in the condensing lens plate, and the projecting lenses in the projection lens plate, all are respectively aligned on converging axes of projection, as at 42. Furthermore, the optical axis of each lens in each lens plate coincides with the axis of projection of the projection system in which the lens is disposed.

Figure 3:
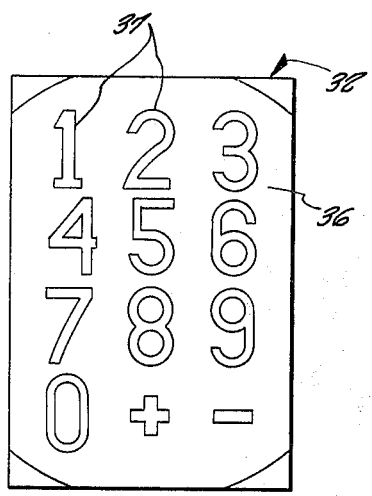
FIG. 3 is a front view of the condenser lens plate of the unit shown in FIGS. 1 and 2.

The construction of the condensing lens plate 32 is illustrated in better detail in FIGS. 4, 5, and 6. The condensing lenses 34 protrude from the rear or convex side of the condensing lens plate and are arranged in a compact grouping in side-by-side locations. The lenses are formed integrally in the transparent material of the plate, and preferably as illustrated in FIGS. 5 and 6, the rear or convex side is coated with an opaque material as at 44, except for the light transmitting faces of the lens themselves. The front or concave side of the condenser lens plate has the coating 36 thereon in which the characters 37 are formed, for example the numerals zero through nine and a plus and minus symbol as illustrated in FIG. 3. To use the character projection unit for displaying numbers 0 through 9, its most basic function, it is readily seen that at least ten lenses in each lens plate are required. To project a particular character onto the screen, the appropriate lamp is energized.

From FIGS. 4, 5, and 6 it will be noted that each condenser lens is conventionally in the form of a figure of revolution about its optical axis 42. The full size of these figures of revolution are indicated by the dotted line extensions of the lenses. However, the perimeter of each lens is chopped off on four sides so that each lens has approximately rectangular outline similar to that of the screen.

The projection lens plate is shown with conventional circular lenses because lens aperture is not so much a problem at this point. However, it may also be constructed with lenses similar to those in the condenser lens plate, except that the lenses are formed on the concave side of the plate. The projection lens plate, except for the lens areas, is preferably coated with an opaque material (not shown) on both sides.

The advantages of employing the rectangular lenses may be seen by reference to FIG. 7. In FIG. 7 there is shown in prior art arrangements and a lower set of four rectangular lenses 48. The lenses in each set of four are disposed on centers having the same spacing. Looking first to the prior art set of four lenses, it will be noted that the closest spacing between the lenses, i.e., where they touch one another, provides a usable lens area indicated by the dotted rectangles within the lenses. Looking at the lower set of lenses, it can be seen that a much larger usable lens area is provided where the superfluous contiguous portions of the circular perimeter of each lens are eliminated, resulting in lenses having a rectangular outline. Also, as may be seen from the lower set of lenses, the rectangular lenses may abut one another so that there is no deep depression or spacing between the perimeters of the rectangular lenses. This provides compactness and facilitates manufacture, particularly in final polishing.

Figure 9:
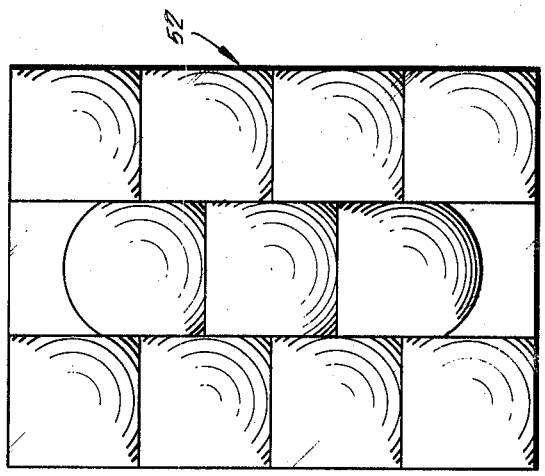
FIG. 9 is a schematic drawing of a group of rectangular lenses arranged with centers offset with respect to one another to correspond to the arrangement of FIG. 8.
Figure 8:
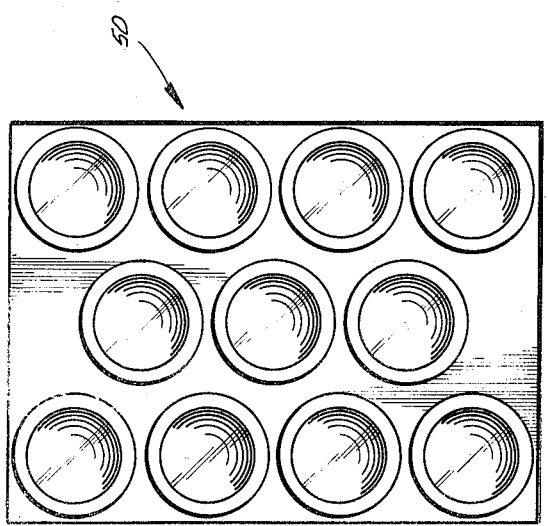
FIG. 8 is a front elevation of a compact arrangement of the grating and light sources of the character projection unit.

The location of each lens in the lower set of lenses of FIG. 7 relative to the adjacent lenses is determined by the arrangement of the lamps 22 in FIGS. 1 and 2. As shown therein the lamps are aligned with each other in three vertical columns of four lamps per column. In certain applications where size and compactness of the display unit is critical, space is further conserved by reducing the number of lamps utilized from twelve to eleven arranging the lens in this manner produces the arrangement 50 as in FIG. 8. The offset arrangement of lamps as shown in FIG. 8 imposes a requirement that the individual lens of the condensor lens plate be offset in a corresponding fashion so that the optical axis of each of the lenses remains in coincidence with the axis of projection of the projection system with which it is associated. Rearranging the lens in this manner produces the arrangement of lenses 52 as shown in FIG. 9.

Because the projection images and screen are normally rectangular the preferred shape of the individual lens is rectangular since this configuration permits the maximum amount of light of be devoted to the formation of the image on the screen, and eliminates the superfluous portions of the circular lenses of the prior art. However, the offset arrangement of rectangular lenses of FIG. 9 is difficult to manufacture because discontinuities between lenses in adjacent rows make it difficult and expensive to polish the lenses.

Figure 10:
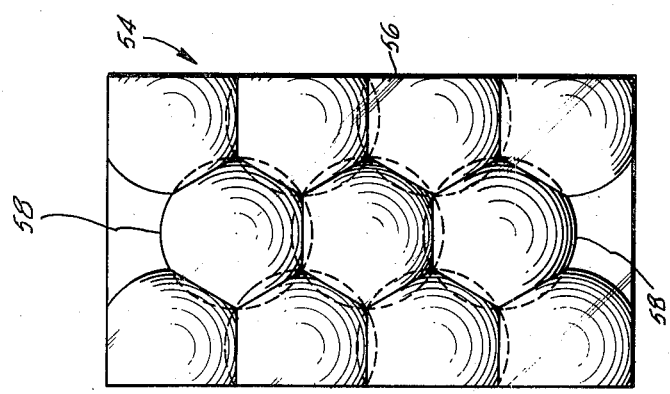
FIG. 10 is a schematic drawing of a lens group illustrating an alternate embodiment to the offset arrangement of rectangular lenses of FIG. 9.

The embodiment of FIG. 10 illustrates one way in which the problem of discontinuities between lenses is eliminated without resort to the use of circular lenses as in the prior art. By chopping off several sides of the lens, an arrangement 54 is obtained which achieves the magnification of lenses whose figures of revolution are indicated by the dotted line extensions of FIG. 10 with lenses of a smaller polygonal shape, as for example, hexagonal or in the case of some lenses located on the periphery 56 of the plate, pentagonal. With lenses of these configurations, all surfaces of adjacent lenses join at common lines of intersection thereby facilitating the polishing step considerably.

The term polygon is not intended to be used in the rigorous sense of a closed planar figure bounded only by straight lines. While it is true that adjacent lenses will abut one another along straight lines, those located at certain points adjacent the periphery 56 of the lens plate have sides 58 adjacent the edge of the plate which are arcuate simply because nothing is gained by chopping off these non-contiguous edges. Hence the use of the term polygon in this context contemplates a closed figure which may have one or more curved sides.

In those applications where size is not critical, larger lenses are now employed which in turn means that larger character forming objects may be etched in the coating 36 on the condenser lens plate, reducing the magnification required of the optical system and increasing the sharpness of the image as well as its brilliancy. Also, the larger size lens itself captures and transmits more light, contributing further to the increased brilliancy of the image.

What is claimed is:

1. In projection display apparatus having a plurality of light sources mounted in side by side relation, a plurality of condensing lenses, a plurality of projection lenses, and a plurality of symbol forming masks disposed between the light sources and projection lenses to form a number of separate and individually complete projection systems within a confined volume and each including a light source, condensing lens, projection lens and symbol forming mask, the improvement comprising a condensing lens plate in which the plurality of individual condensing lenses are supported, each of the condensing lenses being in the form of the maximum rectangular central portion of a figure of revolution about the optical axis of the respective lens on a radius overlapping the corresponding radii of the several adjacent lenses so that common sides of adjacent lenses constitute cords of the intersecting figures of revolution and the symbols in the corresponding masks are of a size such that they would extend beyond the lens periphery, if the lenses were circular and within the same confined area whereby a greater image brightness is achieved within the lens plate size limitation imposed by said confined volume.

2. In projection display apparatus having a plurality of light sources mounted in side by side relation, a plurality of condensing lenses, a plurality of projection lenses, and a plurality of symbol forming masks disposed between the light sources and projection lenses to form a number of separate and individually complete projection systems within a confined volume and each including a light source, condensing lens, projection lens and symbol forming mask, the improvement comprising a condensing lens plate of spherical curvature in which the plurality of individual condensing lenses are supported with their several optical axes convergent in space, each of the condensing lenses being in the form of the maximum rectangular central portion of a figure of revolution about the optical axis of the respective lens on a radius overlapping the corresponding radii of the several adjacent lenses so that common sides of adjacent lenses constitute cords of the intersecting figures of revolution and the symbols in the corresponding masks are of a size such that they would extend beyond the lens periphery, if the lenses were circular and within the same confined area whereby a greater image brightness is achieved within the lens plate size limitation imposed by said confined volume.

3. In a projection display apparatus having a rectangular translucent viewing screen adapted to be viewed from the front and a plurality of converging projection systems mounted within a confined volume behind the screen for selectively projecting different characters onto the screen from the rear and including a plurality of light sources constituting a separate source for each system the improvement which comprises a lens plate of transparent material disposed between the light sources and behind the screen and having an approximately spherical curvature on a radius from the center of the screen, and a plurality of individual condensing lenses formed integrally with the plate material, each lens having an optical axis aligned with the axis of projection of a respective one of said converging projection systems, and each lens being in the form of a figure of revolution about its optical axis with the perimeter of the lens being chopped off on four sides so that the lens has an approximately rectangular outline whereby a greater image brightness is achieved within the lens plate size limitation imposed by said confined volume.

4. In a projection display apparatus having a rectangular translucent viewing screen adapted to be viewed from the front and a plurality of converging projection systems mounted within a confined volume behind the screen for selectively projecting different characters onto the screen from the rear and including a plurality of light sources constituting a separate source for each system the improvement which comprises a lens plate of transparent material disposed between the light sources and behind the screen and having an approximately spherical curvature on a radius from the center of the screen, and a plurality of individual condensing lenses formed integrally with the plate material, each lens having an optical axis aligned with the axis of projection of a respective one of said converging projection systems, and each lens being in the form of a figure of revolution about its optical axis with the perimeter of the lens being chopped off on a plurality of sides so that the lens has an approximately polygonal outline whereby a greater image brightness is achieved within the lens plate size limitation imposed by said confined volume.

5. In a projection display apparatus having a rectangular translucent viewing screen adapted to be viewed from the front and a plurality of converging projection systems mounted within a confined volume behind the screen for selectively projecting different characters onto the screen from the rear and including a plurality of light sources constituting a separate source for each system the improvement which comprises a lens plate of transparent material disposed between the light sources and behind the screen and having an approximately spherical curvature on a radius from the center of the screen, and a plurality of individual condensing lenses formed integrally with the plate material, each lens having an optical axis aligned with the axis of projection of a respective one of said converging projection systems, and each lens being in the form of a figure of revolution about its optical axis with the perimeter of the lens being chopped off on six sides so that the lens has an approximately hexagonal outline whereby a greater image brightness is achieved within the lens plate size limitation imposed by said confined volume.

References Cited by the Examiner

UNITED STATES PATENTS

| 1,072,426 | 9/1913 | Chaflin. | |
| 2,086,182 | 7/1937 | Dvornik | 352—67 |
| 2,600,261 | 6/1952 | Pennington | 88—24 |
| 2,833,176 | 5/1958 | Ossoinak | 352—100 |
| 2,931,027 | 3/1960 | Blefary et al. | |
| 2,981,140 | 4/1961 | Ogle | 88—1 |
| 2,985,873 | 5/1961 | Anthon | 340—378 |
| 2,991,691 | 7/1961 | Sohering | 88—57 |
| 3,026,512 | 3/1962 | Baker | 340—373 |
| 3,096,512 | 7/1963 | Hollowich et al. | 340—378 |

FOREIGN PATENTS 714,246   11/1955   Great Britain.

NORTON ANSHER, *Primary Examiner.*